United States Patent
Vaziri-Farahani et al.

(10) Patent No.: US 8,527,946 B2
(45) Date of Patent: Sep. 3, 2013

(54) DECLARATIVE OBJECT IDENTITY USING RELATION TYPES

(75) Inventors: Mandana Vaziri-Farahani, White Plains, NY (US); Frank Tip, Ridgewood, NJ (US); Stephen J. Fink, Yorktown Heights, NY (US); Julian T. Dolby, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1791 days.

(21) Appl. No.: 11/682,561

(22) Filed: Mar. 6, 2007

(65) Prior Publication Data

US 2008/0222602 A1 Sep. 11, 2008

(51) Int. Cl.
G06F 9/44 (2006.01)

(52) U.S. Cl.
USPC ............................. 717/116; 717/114; 717/126

(58) Field of Classification Search
USPC .......................................................... 717/116
See application file for complete search history.

(56) References Cited

U.S. PATENT DOCUMENTS

| | | | | |
|---|---|---|---|---|
| 6,230,314 | B1* | 5/2001 | Sweeney et al. | 717/108 |
| 6,438,560 | B1* | 8/2002 | Loen | 707/769 |
| 6,925,638 | B1* | 8/2005 | Koved et al. | 717/155 |
| 7,356,802 | B2* | 4/2008 | de Sutter et al. | 717/108 |
| 8,191,040 | B2* | 5/2012 | Hejlsberg et al. | 717/114 |
| 8,214,794 | B2* | 7/2012 | Nigul et al. | 717/104 |
| 8,271,942 | B2* | 9/2012 | Nigul et al. | 717/108 |
| 8,347,266 | B2* | 1/2013 | Meijer et al. | 717/116 |
| 2005/0071810 | A1* | 3/2005 | Sutter et al. | 717/116 |
| 2008/0082972 | A1* | 4/2008 | De Sutter et al. | 717/154 |
| 2008/0222602 | A1* | 9/2008 | Vaziri-Farahani et al. | 717/116 |
| 2009/0150864 | A1* | 6/2009 | Meijer et al. | 717/116 |

OTHER PUBLICATIONS

Joshua Bloch, "Effective Java", May 2001, retrieved from <http://java.sun.com/developer/Books/effectivejava/Chapter3.pdf>, total pp. 36.*
Baker, Equal Rights for Functional Objects or, The More Things Change, The More They Are the Same,ACM OOPS Messenger 4,4 (Oct. 1993), 2-27.*
Haack et al., "Immutable Objects in Java", Apr. 28, 2006, citeseer, retrieved from <citeseerx.ist.psu.edu/viewdoc/summary?doi=10.1.1.156.7970>, total pp. 10.*
Vaziri et al., "Declarative Object Identity Using Relation Types" E. Ernst (Ed.): ECOOP 2007, LN 4609, pp. 54-78, 2007. c Springer-Verlag Berlin Heidelberg 2007, retrieved from <http://link.springer.com/content/pdf/10.1007%2F978-3-540-73589-2_4.pdf>.*
Bloch, "Effective Java Programming Language Guide" 13th Printing Sep. 2006.

(Continued)

Primary Examiner — Don Wong
Assistant Examiner — Marina Lee
(74) Attorney, Agent, or Firm — Jon A. Gibbons; Fleit Gibbons Gutman Bongini & Bianco PL

(57) ABSTRACT

The present invention provides a programming model based on a relational view of the heap which defines identity declaratively, obviating the need for equals( ) and hashcode( ) methods. Each element in the heap (called a tuple) belongs to a relation type and relates an immutable identity to mutable state. The model entails a stricter contract: identity never changes during an execution. Objects, values, and singletons arise as special cases of tuples.

20 Claims, 6 Drawing Sheets

(56) References Cited

OTHER PUBLICATIONS

Gamma et al., "Design Patterns Elements of Reusable Object-Oriented Sotware" 32$^{nd}$ Printing Apr. 2005.
Allen et al. "The Fortress Language Specification" Sep. 2006. Sun Microsystems, Inc.
Appel et al. "Hash-Consing Garbage Collection" Feb. 1993. Princeton University Computer Science Department.
Bacon, David F. "Kava: A Java Dialect with a Uniform Object Model for Lighweight Classes" Jan. 2002. IBM T.J. Watson Research Center.
Birka et al. "A Practical Type System and Language for Reference Immutability" Oct. 2004. MIT Computer Science and Artificial Intelligence Lab.
Carriero et al. "Linda in Context" Apr. 1989. vol. 32 No. 4.
Charles et al. "X10: An Object-Oriented Aproach to Non-Uniform Cluster Computing" Oct. 2005. IBM Corporation.
Krall et al. "On Extending Java" Mar. 1997. Proc. of the Joint Mondular Languages Conference.
Pechtchanski et al. "Immutability Specification and its Applications" Nov. 2002.
Reeuwijk et al. "Adding Tuples to Java: a Study in Lightweight Data Structures" Nov. 2002.
Tschantz et al. "Javari: Adding Refernce Immutability to Java" Oct. 2005.
Yelick et al. "Titanium: A High-Performance Java Dialect" 1998. Computer Science Division University of California at Berkley.
Bierman, et al., "The Essence of Data Access in Cw," Microsoft Research, in European Conference on Object-Oriented Programming (ECOOP'05) 2005.
Meijer, et al., Unifying Tables, Objects and Documents, Microsoft Research, in Proceedings of Declarative Programming in the Context of OO Languages (DP-COOL), 2003.

\* cited by examiner

```
class ResultGroup {
  Object[] row;
  int hashCode;
  private ResultGroup(Object[] row) {
    this.row = row;
    hashCode = 0;
    for (int i = groupBegin;
        i < groupEnd; i++) {
      if (row[i] != null) {
        hashCode += row[i].hashCode();
      }
    }
  }
  public int hashCode() { return hashCode; }
  public boolean equals(Object obj) {
    if (obj == this) { return true; }
    if (obj == null ||
      !(obj instanceof ResultGroup)) {
      return false;
    }
    ResultGroup group = (ResultGroup)obj;
    for (int i = groupBegin;
        i < groupEnd; i++) {
      if (!equals(row[i], group.row[i])) {
        return false;
      }
    }
    return true;
  }
  private boolean equals(Object o1,
      Object o2) {
    return (o1 == null) ? o2 == null
        : o1.equals(o2);
  }
}
```

(a) Program fragment taken from *hsqldb*

```
public class NumberAxis extends ValueAxis ... {
  private boolean autoRangeIncludesZero;
  public boolean equals(Object obj) {
    if (obj == this) { return true; }
    if (!(obj instanceof NumberAxis)) {
      return false;
    }
    if (!super.equals(obj)) { return false; }
    NumberAxis that = (NumberAxis) obj;
    if (this.autoRangeIncludesZero !=
        that.autoRangeIncludesZero) {
      return false; }
    ...
  }
}
public class CyclicNumberAxis
    extends NumberAxis {
  protected double period;
  public boolean equals(Object obj) {
    if (obj == this) { return true; }
    if (!(obj instanceof CyclicNumberAxis)) {
      return false;
    }
    ...
```

```
    ...
    if (!super.equals(obj)) { return false; }
    CyclicNumberAxis that =
      (CyclicNumberAxis) obj;
    if (this.period != that.period) {
      return false;
    }
    ...
}
```

(b) Program fragment taken from *jfreechart*

```
public class LocalVariableGen implements ... {
  public int hashCode() {
    //If the user changes the name or type,
    //problems with the targeter hashmap
    //will occur
    int hc = index ^ name.hashCode()
        ^ type.hashCode();
    return hc;
  }
  public boolean equals( Object o ) {
    if (!(o instanceof LocalVariableGen)) {
      return false;
    }
    LocalVariableGen l = (LocalVariableGen) o;
    return (l.index == index)
        && (l.start == start)
        && (l.end == end);
  }
}
```

(c) Program fragment taken from *bcll*

```
public class MethodNameDeclaration
  public boolean equals(Object o) {
    MethodNameDeclaration other =
      (MethodNameDeclaration) o;
    if (!other.node.getImage().
      equals(node.getImage())) {
      return false;
    }
    ...
  }
}
```

(d) Program fragment taken from *pmd*

```
public class emit {
  protected static void emit_action_code( ... ){
    ...
    if (prod.action() != null &&
      prod.action().code_string() != null &&
      !prod.action().equals(""))
      out.println(prod.action().code_string());
    ...
  }
}
```

(e) Program fragment taken from *javacup*

FIG. 1

```
relation Car {                              1.   public static void main(String[] args){
    key String model;                       2.       Person p1 = Person.id(123);
    key int year;                           3.       Person p2 = Person.id(123);
    key String plate;                       4.       Person p3 = Person.id(456);
}                                           5.       // p1 == p2
                                            6.       // p1 != p3
relation Person {                           7.       // p1.SSN = 789 --> compile error
    key int SSN;
    Name name;                              8.       Name n1 = Name.id("Alice","Jones");
}                                           9.       Name n2 = FullName.id("Alice","Jones","Leah");
                                           10.       p1.name = n1;
relation Name {                            11.       // n1 != n2
    key String first;                      12.       // n1 == ((FullName)n2).toName()
    key String last;                       13.       // p2.name.first == "Alice"
}                                          14.       // p2.name.last == "Jones"

relation FullName extends Name {           15.       Policy pol1 = new Policy();
    key String middle;                     16.       Policy pol2 = new Policy();
    String nickname;                       17.       // pol1 != pol2
}
                                           18.       Car c1 = Car.id("Chevy",2004,"DZN-6767");
class Policy { ... }                       19.       CarInsurance cins = CarInsurance.id(p1,c1);
                                           20.       cins.policy = pol1;
relation CarInsurance {                    21.       cins.computePremium();
    key Person person;
    key Car car;                           22.       PolicyMgr pm = PolicyMgr.id();
    Policy policy;                         23.       pm.add(pol1);
    int computePremium() { ... }           24.       pm.add(pol2);
}
                                           25.       Set<Person> people = new HashSet<Person>();
relation PolicyMgr {                       26.       people.add(p1);
  // no key fields                         27.       people.add(p3);
  public void addPolicy(Policy p){         28.       // people.contains(p2) is true
      policies.add(p);
  }                                        29.       p2.name = n2;
  List<Policy> policies =                  30.       // ((FullName)p1.name).middle == "Leah";
      new ArrayList<Policy>();             31.       // people.contains(p2) is still true
}                                          32.   }
```

FIG. 2

Fig. 8. RJ source code implemented with Java annotations (top), and generated Java implementation (bottom).

types. We examined each class that overrides `equals()`, identified the intended key fields by examining the `equals()` and `hashCode()` implementations, and then manually rewrote the class into a relation type. We then compiled the resulting RJ version of *javacup* into Java, ran both the original version and this generated version on a grammar for Java 5 and ensured that the resulting generated parsers are identical.

In the course of this exercise, we needed to apply a number of refactorings that preserve the behavior of *javacup*, but that ease the introduction of relation types. The most significant of these refactorings consisted of:

- Key fields were made `private` and `final`. In a few cases, methods that initialize these fields were inlined into a calling constructor, or eliminated as dead code. In a few cases, some minor code restructuring was needed to eliminate "spurious mutability".
- Nontrivial constructors were replaced by a combination of (i) simple constructors that only initialize key fields, and (ii) factory methods [15] that contain the remaining initialization code for, e.g., initializing mutable fields.
- In a few cases, the code contained implicit up-casts to type `Object` because tuples were stored into collections. In such cases, we parameterized uses of collection types with parameters of the appropriate relation type in order to avoid the up-cast.

| class | actions performed |
|---|---|
| java_cup.production_part | Converted into relation type: 1 key field, 0 non-key fields |
| java_cup.action_part | Converted into relation type: 1 key field, 0 non-key fields |
| java_cup.symbol_part | Converted into relation type: 1 key field, 0 non-key fields |
| java_cup.parse_action | Converted into singleton relation type (0 key fields, 0 non-key fields) |
| java_cup.nonassoc_action | Converted into singleton relation type (0 key fields, 0 non-key fields) |
| java_cup.shift_action | Converted into relation type: 1 key field and 0 non-key fields |
| java_cup.reduce_action | Converted into relation type: 1 key field, 0 non-key fields. Error in use of equals() previously discussed in Section 2.2. |
| java_cup.production | Converted into relation type: 1 key field, 14 non-key fields |
| java_cup.action_production | Converted into relation type: 0 key field, 2 non-key fields |
| java_cup.lr_item_core | This class and its subclass lalr_item were refactored into a combination of 2 classes without equals()/hashCode() and one relation type with 2 key fields and 0 non-key fields. |
| java_cup.lalr_item | See comments for java_cup.lr_item_core. |
| java_cup.lalr_state | Converted into relation type: 1 key field, 2 non-key fields |
| java_cup.symbol_set | Not converted because equals() refers to mutable state. Note: equals() is dead, so could simply be removed. |
| java_cup.terminal_set | Not converted because equals() refers to mutable state. Note: equals() is dead, so could simply be removed. Does not declare hashCode(), hence equals()/hashCode() contract violated. |
| java_cup.lalr_item_set | Not converted because equals() refers to mutable state. |

Table 1

FIG. 5

| benchmark | #equals() | | | #relation types | | | | bugs/issues |
|---|---|---|---|---|---|---|---|---|
| | orig. | removed | % | total | value | sing. | non-value | |
| ant | 12 | 9 | 75.0 | 9 | 3 | 0 | 6 | H,M |
| bcel | 20 | 14 | 70.0 | 22 | 11 | 5 | 11 | F,H,M |
| hsqldb | 12 | 2 | 16.7 | 2 | 0 | 0 | 2 | E,F,M,S |
| javacup | 14 | 11 | 78.6 | 11 | 8 | 2 | 3 | H,M,T |
| jfreechart | 46 | 33 | 71.7 | 40 | 40 | 1 | 0 | H,M,S |
| lucene | 27 | 27 | 100.0 | 27 | 23 | 0 | 4 | E,M |
| pmd | 12 | 5 | 41.7 | 5 | 3 | 2 | 2 | E,F,M,N,S |
| shrike | 32 | 32 | 100.0 | 61 | 55 | 3 | 6 | — |

Table 2

FIG. 6

DECLARATIVE OBJECT IDENTITY USING RELATION TYPES

STATEMENT REGARDING FEDERALLY SPONSORED RESEARCH

This invention was made with Government support under Contract No.: NBCH30390004 awarded by the Defense Advanced Research Projects Agency (DARPA). The Government has certain rights in this invention.

FIELD OF THE INVENTION

The present invention generally relates to the field of programming and more particularly to how object identity is determined for object-oriented programming.

DESCRIPTION OF RELATED ART

Object-oriented languages such as Java and C# support an address-based notion of identity for objects or reference types. By default, the language considers no two distinct object instances equal; Java's java.lang.Object.equals( ) tests object identity by comparing addresses. Since programmers often intend an alternative notion of equality based on forms of structural equivalence, one may override the equals( ) method, leaving the definition of identity to the programmer's imagination.

In order for standard library classes such as collections to function properly, Java mandates that an equals( ) method satisfy an informal contract. First, it must define an equivalence relation, meaning that equals( ) should encode a reflexive, symmetric, transitive relation. Second, the contract states that "it must be consistent", i.e., two objects that are equal at some point in time must remain equal, unless the state of one or both changes. Third, no object must be equal to null. Furthermore, when a programmer overrides equals( ), he must also override hashcode( ) to ensure that equal objects have identical hash-codes.

Programmer customization of identity semantics causes problems for several reasons. First, creating an equivalence relation is often non-trivial and, in some cases, impossible (see Bloch, J. Effective Java, Programming Language Guide. Addison-Wesley, 2001, which is hereby incorporated by reference in its entirety). This is discussed further in the Section entitled "Overview" below. Second, the language has no mechanism to enforce the contract either statically or dynamically, leaving many opportunities for programmer errors. Buggy or fragile equals( ) methods have been found in nearly every Java application examined. This is discussed further in the Section entitled "Overview" below. Third, programmer identity tests often comprise repetitive and error-prone boiler-plate code, which must be updated manually as the code evolves over time. Even more boiler-plate code arises in patterns such as caching via hash-consing (see Appel et al. "Hash-Consing Garbage Collection" February 1993. Princeton University Computer Science Department, which is hereby incorporated by reference in its entirety)

Accordingly, a need exists for a method and system to mitigate the problems with programmer customization of identity semantics.

SUMMARY OF THE INVENTION

The present invention overcomes many of problems associated with the customization of identity semantics by providing a programming model in which object identity is specified declaratively, without tedious and error-prone equals( ) and hashcode( ) methods. The model features a new language construct called a relation type. Each relation type declares zero or more fields, and designates a (possibly empty) subset of these as immutable key fields. An instance of a relation type is called a tuple, and the identity of a tuple is fully determined by its type and the identities of the instances referred to by its key fields. Consequently, our programming model provides a relational view of the heap, as a map from identities to their associated mutable state. In other words, two tuples a and b are equal if and only if: (i) a and b are of the same type and, (ii) corresponding key fields in a and b are equal. Operationally, one can think of tuples with the same identity as pointing to the same heap location, and the model of the present invention permits efficient implementations (e.g., the use of space-efficient shared representations in combination with pointer-equality for fast comparisons).

The model of the present invention enforces a stricter contract than Java's since object identity never changes, and tuples of different types must have different identities. Several existing concepts arise as special cases of relation types: (i) a class of objects is one with an address as its only key field, (ii) a value-type (see Bacon, D. F. Kava: A Java dialect with a uniform object model for lightweight classes. Concurrency—Practice and Experience 15, 3-5 (2003), 185-206 and Charles, P., Grothoff, C., Saraswat, V., Donawa, C., Kielstra, A., Ebcioglu, K., von Praun, C., and Sarkar, V. X10: an object-oriented ap-proach to non-uniform cluster computing. In Proceedings of the 20th annual ACM SIGPLAN conference on Object oriented programming, systems, languages, and applications (OOPSLA'05) (2005), pp. 519-538, which is hereby incorporated by reference in its entirety) is one with only key fields, and (iii) an instance of the SINGLETON design pattern (see Gamma, E., Helm, R., Johnson, R., and Vlissides, J. Design Patterns, Elements of Reusable Object-Oriented Software. Addison-Wesley, 1995, which is hereby incorporated by reference in its entirety) is one with no key fields.

In one embodiment, the programming model of the present invention is implemented by way of a small extension of Java called RJ, and an RJ-to-Java compiler. The classes that define equals( ) methods in several Java applications are examined and refactored to use relation types instead. Experiments indicate that the majority of classes that define equals( ) can be refactored with minimal effort into relation types, and that most of the remainder are buggy or fragile.

The present invention provides:

1. A programming model in which object identity is defined declaratively using a new language construct called relation types. By construction, relation types satisfy a strict contract that prevents several categories of bugs, and admits efficient implementations. Objects, value types, and singletons arise as special cases of the model.

2. Java is extended with relation types (RJ), and an RJ-to-Java compiler was created. Experiments indicate that the majority of classes that define equals( ) in several Java applications can be refactored into relation types, and that most of the remainder are buggy or fragile.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 1 illustrates various examples of problems with equality contracts encountered.

FIG. 2 is a simple example of pseudo-code with relation types, according to the present invention.

FIG. 4 shows the annotated source and generated code for the Person class from FIG. 2, according to the present invention.

FIG. 5 is a Table 1 of summary of results for a case study involving the javacup application, according to the present invention.

FIG. 6 is a Table 2 summarizes the findings of the present invention

DETAILED DESCRIPTION OF THE PREFERRED EMBODIMENTS

Figure 3:
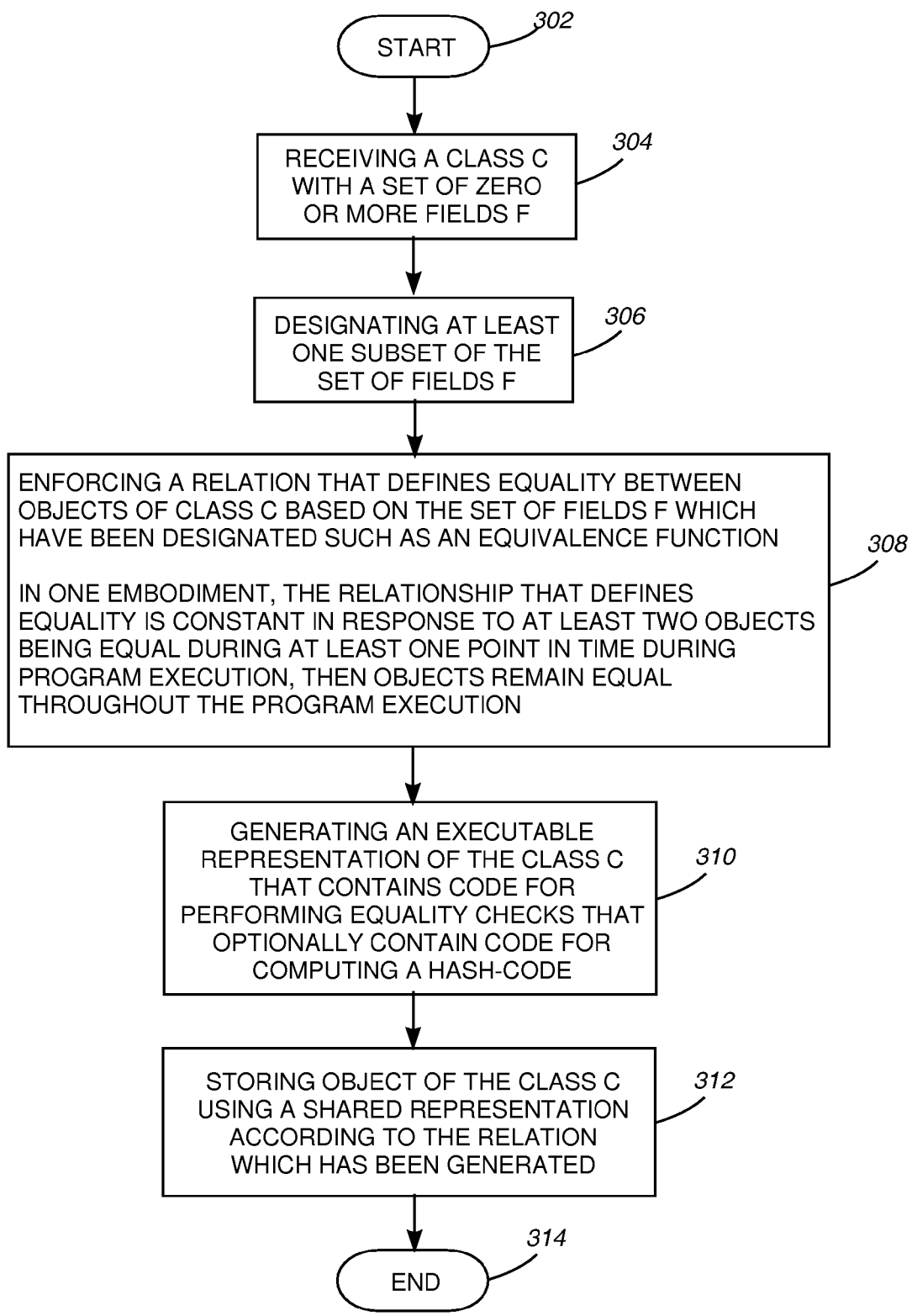
FIG. 3 is a flow chart of the method of determining an identity for objects generated by an application, according to the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Overview of Approach
Overview of RJ

This section examines Java's equality contract and illustrates several motivating problems. Next the present invention is presented based on relation types.

Java's Equality Contract

The following is Java's equality contract. Specifically the contract for the equals( ) method in java.lang.Object (see http://java.sun.com/j2se/1.5.0/docs/api/java/lang/Object.html, which is hereby incorporated by reference in its entirety). The equals method implements an equivalence relation on non-null object references:

(1) It is reflexive: for any non-null reference value x, x.equals (x) should return true.
(2) It is symmetric: for any non-null reference values x and y, x.equals(y) should return true if and only if y.equals(x) returns true.
(3) It is transitive: for any non-null reference values x, y, and z, if x.equals(y) returns true and y.equals(z) returns true, then x.equals(z) should return true.
(4) It is consistent: for any non-null reference values x and y, multiple invocations of x.equals(y) consistently return true or consistently return false, provided no information used in equals comparisons on the objects is modified.
(5) For any non-null reference value x, x.equals(null) should return false.

Furthermore, whenever one overrides equals( ), one must also override hashcode( ), to ensure that equal objects have identical hash-codes.

This contract has several problems. First, it is impossible to extend an instantiatable class with a new field, and have the subclass be comparable to its superclass, while preserving the equivalence relation. Consider the example shown below (taken from (see Bloch, J. Effective Java, Programming Language Guide. Addison-Wesley, 2001, which is hereby incorporated by reference in its entirety).

```
class Point {                              class ColorPoint extends Point {;
    int x;                                     Color color
    int y;                                     public boolean equals(Object o){
    public boolean equals(Object o){               if (!(o instanceof Point))
        if (!(o instanceof Point))                     return false;
            return false;                          if (!(o instanceof ColorPoint))
        return ((Point)o).x == x                       return o.equals(this);
            && ((Point)o).y == y;              return super.equals(o) &&
    }                                              ((ColorPoint)o).color == color;
}                                              }
                                           }
```

Here, the equals( ) method of ColorPoint must be written as such to preserve symmetry. However, this violates transitivity as indicated in (see Bloch, J. Effective Java, Programming Language Guide. Addison-Wesley, 2001, which is hereby incorporated by reference in its entirety). If one defines three points as follows:

ColorPoint p1=new ColorPoint(1, 2, Color.RED);
Point p2=new Point(1, 2);
ColorPoint p3=new ColorPoint(1, 2, Color.BLUE);

then p1.equals(p2) is true and so is p2.equals(p3), but p1.equals(p3) is false since color is taken into account.

A second problem with the contract is that the consistency (non-)requirement allows the identity relation defined by the equals( ) method to change over time: equals( ) may refer to mutable state. If an object's identity relation changes while the object resides in a collection, the collection's operations (e.g. add( ) and remove( )) will not function as intended.

Most importantly, neither the compiler nor the runtime system enforces the contract in any way. If the programmer mistakenly violates the contract, the problem can easily manifest as symptoms arbitrarily far from the bug source. A correct implementation involves nontrivial error-prone boilerplate code, and mistakes easily and commonly arise, as discussed below in the Section entitled "Examples".

Java's contract (but not C#'s) is also under-specified because it permits equals( ) and hashCode( ) to throw runtime exceptions that could be avoided.

EXAMPLES

FIG. 1 are examples of problems with equality contract encountered. Several applications have been examined, and many problems in implementations of equals( ) and hashcode( ) methods were found, such as:

(a) Dependence on mutable state. FIG. 1(a) shows a fragile code fragment from org.hsqldb.GroupedResult.ResultGroup in hsqldb, where equals( ) and hashCode( ) refer to a mutable field row of type Object[ ], which is updated elsewhere. If the program modifies a row while a ResultGroup is stored in a collection, then subsequent attempts to retrieve elements from that collection may fail or produce inconsistent results. (Note that, if an ordered collection such as a TreeSet is used, then the modification of an element after storing it into the collection may affect retrieval operations involving other elements.) While the equals( ) contract does not prohibit equals( ) and hashCode( ) from referring to mutable state, it "handles" these cases by declaring that "all bets are off" when the identity relation changes. The programmer must carefully maintain the non-local invariant that mutations do not overlap with relevant collection lifetimes, often resulting in buggy or hard-to-maintain code.

(b) Asymmetry. FIG. 1 (b) shows excerpts from two classes from jfreechart, one a superclass of the other. These equals( ) implementations are asymmetric: it is easy to construct a NumberAxis a and a CyclicNumberAxis b such that a.equals(b) but !b.equals(a). This violates the contract and may produce inconsistent results if a heterogeneous collection contains both types of objects.

(c) Contract for equals( )/hashCode( ). In FIG. 1 (c), from bcel, equals( ) and hashCode( ) refer to different subsets of the state, so two equal objects may have different hashcodes. The developers apparently knew of this problem as is evident from the comment "If the user changes the name or type, problems with the targeter hashmap will occur".

(d) Exceptions and null values. FIG. 1 (d) shows an equals( ) method from pmd, which has two immediate problems. First, if the parameter o is null, the method throws a NullPointerException rather than return false as per the contract. Second, the code will throw a ClassCastException if this object is ever used in a collection that compares it to an object of an incompatible type.

(e) Inadvertent test of incomparable types. FIG. 1 (e) shows a buggy code fragment taken from method java_cup.emit.emit_action_code( ) in javacup. Here, the last part of the condition, !prod.action( ).equals (" "), compares an object of type java_cup.action_part with an object of type String. Such objects are never equal to each other, hence the condition trivially succeeds. This bug causes spurious blank lines in the parser that is generated by javacup. We confirmed with the developers (see Petter, M. Personal communication. October 2006, which is hereby incorporated by reference in its entirety) that they intended to write !prod.action( ).code_string( ).equals(" "). More generally, the problem is that objects of arbitrary types are allowed to be equal to each other under the current contract, and as a result, it is not possible to check for inconsistent comparisons at compile-time.

Revised Equality Contract

Revised Equality Contract for $==_R$ identity relation, on non-null references:

(1') $==_R$ is reflexive: For any non-null reference value x, $x==_R x$ must return true.

(2') $==_R$ is symmetric: For any non-null reference values x and y, $x==_R y$ returns true if and only if $y==_R x$ returns true.

(3') $==_R$ is transitive: For any non-null reference values x, y, and z, if $x==_R y$ returns true and $y==_R z$ returns true, then $x==_R z$ must return true.

(4') For any non-null reference values x and y, multiple tests $x==_R y$ consistently return true, or consistently return false throughout the execution.

(5') For any non-null reference value x, $x==_R$ null must return false.

The present invention provides a model that forces programmers to define object identity declaratively. In this model, programmers must explicitly indicate the fields in a type that comprise its identity, automatically inducing an equivalence relation. The programming model of the present invention enforces a new equality contract as defined above.

The model of the present invention's revised contract differs from Java's as follows:

It is enforced: The language implementation generates the equivalence relation automatically and forbids the programmer from manipulating this relation explicitly.

It is more strict than the original contract in item (4'); object identity cannot change throughout the execution of a program.

The problems with defining an equivalence relation in the presence of subclassing are resolved by making relation types and their subtypes incomparable, meaning that $x==_R y$ will always evaluate to false if x and y are not of exactly the same type.

Relation Types

Our programming model introduces a new notion of class called a relation type. An informal overview of this notion is presented here; the Section entitled "Core Calculus for RJ" below defines the semantics formally.

A relation type resembles a class in Java, except a programmer may not override the equals( ) and hashCode( ) methods. Instead, the programmer must designate a (possibly empty) subset of instance fields as key fields, using the keyword key. Key fields are implicitly final and private. In the present invention, an instance of a relation type is called a tuple, and its identity is fully determined by its type and the identities of the instances referred to by its key fields.

The programmer does not explicitly allocate a tuple using new; instead, she calls a predefined id( ) method, whose formal parameters correspond exactly to the types of the key fields (including all those declared in its supertypes). Informally, the id( ) method does an associative lookup to find the tuple with the same identity. If no such tuple is found, id( ) creates a new tuple.

Referring now to FIG. 2, illustrated are simple examples of pseudo-code with relation types. The relation type Car declares key fields model, year, and plate. This means that two cars with the same model, year and plate have the same identity and are indistinguishable. Since Car has no mutable state, it can be viewed as a value type (see Bacon, D. F. Kava: A Java dialect with a uniform object model for lightweight classes. Concurrency—Practice and Experience 15, 3-5 (2003), 185-206, which is hereby incorporated by reference in its entirety).

Relation types are more general than value types because tuples may contain mutable state. Consider relation type Person, which has a key field SSN and a mutable field name. This means that there exists at most one Person tuple with a given SSN, and that assignments to SSN are forbidden. So on the right side of the example, variables p1 and p2 refer to the same tuple (they are aliased). Assignments to the non-key field name are allowed (see line 10).

Inheritance among relation types resembles single inheritance for classes: sub-types may add (but not remove) additional key fields as well as other instance fields and methods. A subtype inherits methods and fields declared in a relation supertype. A relation type and its subtype are incomparable; subtype tuples have different identity from supertype tuples. Should the programmer want to compare a tuple to the corresponding subtuple of a subtype, the language provides predefined coercion methods to convert subtypes to supertypes.

Consider the relation type Name and its subtype FullName in FIG. 2. Tuples of these relations have different identities (see line 11), and the predefined coercion operator toName( ) must be used to compare the corresponding key fields of these relations (see line 12). The assertions shown on lines 13 and 14 follow from the fact that p1 and p2 refer to the same tuple.

Conceptually, traditional Java classes (with address-based identity) correspond to relation types with an implicitly defined key field address, assigned a unique value by an object constructor. In the present invention the class keyword is used to indicate a relation type with an implicit address field (see class Policy in the example). The two tuples (objects) of type Policy created at lines 15 and 16 will not have the same identity (see line 17). Note that classes may not explicitly declare key fields or inherit from relation types that do. Our relation keyword indicates the absence of an address key field.

The relation type CarInsurance illustrates how relation types provide a relational view of the heap. The CarInsurance type maps distinct identities to mutable state stored in the policy field. By analogy to relational databases, the CarInsurance type resembles a relational table with three columns, two of which are keys. The type also defines methods such as computePremium( ) that may refer to all of all state of a particular CarInsurance tuple.

If a relation type has no key fields, then it corresponds to the SINGLETON design pattern (see Gamma, E., Helm, R., Johnson, R., and Vlissides, J. Design Patterns, Elements of Reusable Object-Oriented Software. Addison-Wesley, 1995, which is hereby incorporated by reference in its entirety), since its identity consists solely of the type. FIG. 2 shows a (SINGLETON) relation type PolicyMgr that provides access to a globally accessible list of insurance policies. Lines 22-24 access this list.

Finally, lines 25-31 illustrate what happens when tuples are inserted into collections. Here, we define a set people and add p1 and p3 to it. Since p1 and p2 are equal, the test people.contains (p2) returns true. Now if we modify p2 by changing its name field (line 26), p2 remains in the set as expected (line 28). The result of the test remains unchanged because the identity of p2 did not depend on mutable state, and p2 was not removed from the set.

Lifetime Management and Namespaces

Thus far, it has been assumed that each relation type provides a single, global namespace for tuples of said type. Under this model, the program can support at most one tuple with a given identity. Now, consider the case where at least one of a tuple t's key fields contains a reference to an object o. Then, there is no way to reconstruct t's identity once o has been garbage-collected, and t itself becomes garbage at that point. However, if t's identity is computable (i.e., all key fields refer to values that can be recomputed), then the implementation cannot know a priori whether the program will try to retrieve t in the future. In such cases, t is immortal and cannot be garbage-collected.

For a more flexible, practical model, the programmer can use scopes to provide separate namespaces for a type, and also to control tuple lifetime. Consider the pseudo-code of shown below in Column (A). The code creates two Persons, each with the same identity (3), but which reside in different scopes. First, an object of an implicitly defined type Scope<Person> is created by calling a predefined method Person.newScope( ). Type Scope<Person> declares an id( ) method with the same signature as that of Person. Then, instead of creating a tuple from global namespace via Person.id( ), the programmer allocates a tuple from a particular named scope (e.g., s1.id( )). Regarding garbage collection: a tuple becomes garbage when the program holds no references to its containing scope (provided all of its key fields have become garbage). In the example code, if foo returns jack, then jane may be garbage-collected when foo returns, since there will be no live references to jane nor its scope s2.

```
Person foo( ) {
    Scope<Person> s1 = Person.newScope( );
    Person jack = s1.id(3);
    jack.setName(Name.id("Jack","Sprat"));
    Scope<Person> s2 = Person.newScope( );
    Person jane = s2.id(3);
    jane.setName(Name.id("Jane","Sprat"));
    return (*) ? jack : jane;
}
(A)
```

```
Person foo( ) {
    Object s1 = new Object( );
    Person jack = Person.id(3,s1);
    jack.setName(Name.id("Jack","Sprat"));
    Object s2 = new Object( );
    Person jane = Person id(3,s2);
    jane.setName(Name.id("Jane","Sprat"));
    return (*) ? jack : jane;
}
(B)
```

The base programming model can emulate programming with scopes. To each relation type is added an implicit key field called scope, whose type is an object, and whose reference is weak (does not preclude garbage collection). Column (B) shows how the example of Column (A) could be emulated. The language could include further syntactic sugar for scopes, such as lexical scope declarations, and utility functions to move tuples between different scopes via copying. For further information, a more formal definition of a core calculus for the RJ language as an adaptation of Featherweight Java can be found in IBM Research Report RC24196 entitled "Declarative Object Identity Using Relation Types" by Mandana Vaziri, Frank Tip, Stephen Fink, and Julian Dolby, which is hereby incorporated by reference in its entirety.

Implementation and Evaluation

To evaluate the utility of relation types, Java was extended with relation types and a compiler was developed for translating programs written in the resulting RJ language to Java. The classes that define equals( ) and hashCode( ) in a number of open-source Java applications were examined. For each application, we determined if and how these classes could be rewritten with relation types.

Implementation

RJ adds a few minor extensions to Java syntax:

The relation keyword indicates that a class or interface is a relation type.

The key keyword indicates that a field in a relation type is a key field. A relation class may have zero or more key fields.

For each relation class R, an id( ) method is implicitly defined with return type R and argument types corresponding to the key fields in R and its supertypes.

Conceptually, the hierarchy of relation types is completely distinct from the hierarchy of (non-relation) reference types.

For pragmatic reasons, the implementation makes java.lang.Object the implicit supertype of a all relation types, but relation types cannot inherit explicitly from a reference types or vice versa.

RJ was implemented using the Java 5.0 metadata facility. Embedding the RJ language in Java enabled us the use of the Eclipse JDT refactoring frame-work as the basis for the compiler. Concretely, relation types are annotated with a @Relation annotation and key fields with a @Key annotation. Furthermore, the implicitly defined id( ) method is modeled as a constructor annotated with the @Id annotation. Of course in a full language implementation, the programmer would not need to declare an id( ) method; the prototype implementation requires the explicit constructor as an expedient way to interoperate with the Eclipse Java development tools.

Since our experiments target converting Java classes into relation types, our RJ implementation allows non-relation types and relations to co-exist. Specifically, we allow the declaration of equals( ) and hashCode( ) methods in non-relation Java classes.

We implemented a simple type checker for RJ that enforces the following constraints on relation types:

Up-casts (implicit or explicit) from a relation type to Object are disallowed.

Key fields must be private and final.

Declaring equals( ) and hashCode( ) in a relation type is disallowed.

In order to avoid programmer errors, the application of the == and != operators to one operand of a relation type and another operand of a reference type results in a type error.

Calling equals( ) on an expression of a relation type is a type error.

The computer implemented method for determining an identity for objects generated by an application is first described using a flow chart in FIG. 3 and then second with reference to an implementation using an RJ complier. Referring now to FIG. 3 shown is a flow chart of a method 300 of determining an identity for objects generated by an application. The computer-based method begins at step 302 and immediately proceeds to step 304 where the step of receiving a class C with a set of zero or more fields F is performed. Next in step 306 at least one subset of the set of fields F is designated. Next in step 308, an executable representation that defines equality between objects of the class C based on the set of fields F which have been designated is enforced. In another embodiment the relation that defines equality which has been generated is an equivalence relation. In another embodiment, the relation that defines equality is constant in response to at least two objects being equal during at least one point in time during program execution, then the objects remain equal throughout the program execution. Next in step 310 an executable representation of the class C that contains code for performing equality checks is generated. In one embodiment, the executable representation of class C contains code for computing a hash-code. Next in step 312, the objects of the class C are stored using a shared representation according to the relation which has been generated and method ends at step 314.

Now the computer implemented method for determining an identity for objects is described using an RJ compiler implementation. The RJ compiler translates RJ to Java using the AST rewriting infrastructure in Eclipse. The translation involves the following steps:

(i) generation of a nested Key class that contains the key fields declared in a relation type and that implements appropriate equals( ) and hashCode( ) methods, (ii) generation of a static map that contains the relation's tuples, (iii) generation of a constructor that initializes the key fields from corresponding formal parameters, (iv) generation of the id( ) method that returns a tuple with a given identity if it already exists, and creates such a tuple otherwise, and (v) updating the references to key fields (necessary because these fields are moved into the generated Key class).

Although this translation aims at the maximum amount of sharing. It is within the true scope and spirit of the present invention to use several alternative translation approaches, e.g., one could directly include all key fields in the tuple but this is potentially inefficient because one cannot use == to compare tuples in the translated code. FIG. 4 shows the annotated source and generated code for the Person class from FIG. 2.

In the basic implementation approach discussed so far, tuples are never garbage collected. Therefore we have an alternative implementation based on weak references, which collects tuples when their identity becomes unreachable, as we discussed in the Section entitled "Lifetime Management and Name Spaces." In this approach, the key fields use WeakReferences as pointers, and relation types use the ReferenceQueue notification mechanism to remove a tuple when any of its weak referents becomes dead. Additionally, the canonicalized tuple objects are cached using SoftReferences. If none of the key fields of a relation type are of reference types, the scope mechanism discussed in Section entitled "Lifetime Management and Namespaces" can be used. A scope is a reference, so when the scope dies, so do its tuples.

Case Study: javacup

Now is describes in detail one case study, investigating how javacup (version 11a), an LALR parser generator written in Java, can be refactored to use relation types. Each class that overrides equals( ) is examined, the intended key fields are identified by examining the equals( ) and hashCode( ) implementations, and the class is manually rewritten into a relation type. Next the resulting RJ version of javacup is compiled into Java, the original version and this generated version are both executed on a grammar for Java 5 and it is established that the resulting generated parsers are identical.

In the course of this investigation, a number of refactorings are applied that preserve the behavior of javacup, but that ease the introduction of relation types. The most significant of these refactorings consisted of:

Key fields were made private and final. In a few cases, methods that initialize these fields were inlined into a calling constructor, or eliminated as dead code. In a few cases, some minor code restructuring was needed to eliminate "spurious mutability".

Nontrivial constructors were replaced by a combination of (i) simple constructors that only initialize key fields, and (ii) factory methods (see Gamma, E., Helm, R., Johnson, R., and Vlissides, J. Design Patterns, Elements of Reusable Object-Oriented Software. Addison-Wesley, 1995, which is hereby incorporated by reference in its entirety) that contain the remaining initialization code for, e.g., initializing mutable fields.

In a few cases, the code contained implicit up-casts to type Object because tuples were stored into collections. In such cases, we parameterized uses of collection types with parameters of the appropriate relation type in order to avoid the up-cast.

FIG. 5 is a table 1 of summary of results for javacup case study, according to the present invention.

After performing these steps, we deleted the equals( ) and hashCode( ) methods, added @Relation, @Key, and @Id annotations, and ensured that the resulting code could be compiled and executed successfully.

Interestingly, we found that the resulting version of javacup produced a parser with significantly different source text than the parser produced by the original javacup, but that these parsers behave identically when applied to a number of inputs. Further investigation revealed that the output of the original version depended on iterators whose order relied on hash-codes of the elements stored in hash-tables. The hashCode( ) methods in our generated code differ from those in the original javacup, which resulted in different (but equivalent) generated parsers. As a further experiment, we rewrote javacup to use LinkedHashMaps instead of Hashtables, and repeated the entire experiment. (A LinkedHashMap is a hashtable for which the iteration order is determined by the order in which elements are inserted instead of depending on the hash-codes of the elements.)

The resulting javacup produced a parser that was syntactically identical to the one that was produced by the original javacup.

Table 1 in FIG. 5 shows, for each class in javacup with an application-defined equals( ) method, the outcome of this exercise.

As the table shows, of 15 classes with application-defined equals( ) methods, 12 could be converted into relation types, and most of them with relatively little effort. Classes lr_item_core and lalr_item required a somewhat nontrivial transformation. The equals( ) methods in these classes do not reflect general object identity, but only apply within the context of an lalr_item_set. We therefore removed these equals( ) methods and rewrote lalr_item_set to appropriately manipulate these objects using a newly created relation type ItemKey. Another item of note was a bug in a use of reduce_action.equals( ) that we previously discussed in Section entitled "Examples" above. Types symbol_set, terminal_set and lalr_item_set could not be converted because their equals( ) methods refer to mutable collections. Interestingly, the equals( ) methods in symbol_set and terminal_set are dead, and could be removed. Furthermore, class terminal_set violates the equals( )/hashCode( ) contract by not overriding Object.hashCode( ).

Other Benchmarks

The techniques described in the embodiment of the present invention above have been repeated on a number of open-source Java applications. The benchmarks ant, hsqldb, jfreechart, lucene, and pmd are open-source codes; we used the versions collected in the DaCapo benchmarks (see Blackburn, S. M., Garner, R., Hoffman, C., Khan, A. M., McKinley, K. S., Bentzur, R., Diwan, A., Feinberg, D., Frampton, D., Guyer, S. Z., Hirzel, M., Hosking, A., Jump, M., Lee, H., Moss, J. E. B., Phansalkar, A., Stefanovi' c, D., VanDrunen, T., von Dinckläge, D., and Wiedermann, B. The DaCapo benchmarks: Java benchmarking development and analysis. In OOP-SLA '06: Proceedings of the 21st annual ACM SIGPLAN conference on Object-Oriented Programming, Systems, Languages, and Applications (New York, N.Y., USA, October 2006), ACM Press, which is hereby incorporated by reference in its entirety), version dacapo-2006-10. (jfreechart has more than 200 equals( ) methods—a daunting number to study by hand. So we looked only at the first two packages in lexicographic order: org.jfree.chart.annotations and org.jfree.chart.axis.) Bcel is the Apache Bytecode Engineering Library (see Apache Jakarta Project. BCEL, December 2006. http://jakarta.apache.org/bcel/, which is hereby incorporated by reference in its entirety), version 5.2. Shrike is the com.ibm.wala.shrike project from the T. J. Watson Libraries for Analysis (WALA) (see T. J. Watson Libraries for Analysis, December 2006. http://wala.sourceforge.net, which is hereby incorporated by reference in its entirety), version 1.0. We use shrike regularly, and chose it for consideration based on prior knowledge that it would suit relation types.

Shrike also has sophisticated, hand-rolled hash-consing, which is now generated automatically by the RJ compiler. The other benchmarks were chosen based on their having a reasonable number of equals( ) methods, and based on the availability of some drivers to test for correct behavior.

As described for javacup earlier, we transformed each code by hand where necessary to make fields private and final, remove unnecessary mutable state, and similar local changes. While we believe our transformations were correct (modulo erroneous existing behavior), we have no mechanical proof that the changes are semantics-preserving. We ran a number of dynamic tests for each code, including unit tests where available, the DaCapo drivers, and other drivers we created, and verified that for each test the RJ implementation behaves identically to the original implementation. This methodology gives us some confidence that the RJ versions are correct.

Table 2 in FIG. 6 summarizes the findings of the present invention. The columns of the table show, for each benchmark, from left to right:

1. The number of equals( ) methods originally declared.
2. The number of equals( ) methods eliminated by conversion to relation types.
3. The percentage of eliminated equals( ) methods.
4. The total number of relation types introduced.
5. The number of relation types that correspond to value types (i.e., all fields are key fields).
6. The number of relation types that correspond to singletons.
7. The number of relation types that have non-key fields.
8. A summary of the bugs and issues that we encountered, as explained in the legend of the table.

As the Table 2 reflects, during this investigation we were able to convert the majority of candidate classes to relation types with little program modification. Most of these types actually represent values with no mutable state. As is well known, programming in a functional style without mutation eliminates many classes of bugs and generally leads to more robust, maintainable code. Relation types fit well into such a programming style.

The last column of the table shows that we found violations of the contract and other problems in every code except shrike. This reinforces our claim that the current unenforced contract leads to fragile and error-prone code. Relation types encourage more robust code by enforcing a stricter contract and removing the need for tedious, error-prone boiler plate code.

Of the types which we did not convert to relation types, most fall into one of two categories. The first category comprises types where the programmer had already manually applied hash-consing or other caching and pooling optimizations. In such cases, the program complexity exceeded our threshold for rewriting in these experiments. Relation types would obviate the need for such manual storage optimizations, since the compiler can implement hash-consing and related representation transformations automatically.

The other category comprises types where identity depends on mutable state. Many instances of mutable identity appear spurious, and could be eliminated with a slightly more functional design. We also found a fairly large number of cases we call piecemeal initialization. In these cases, the program incrementally builds up an object's state piecemeal; for example, the program parses an XML document and mutates an object to represent the state as it parses. However, the object becomes logically immutable after initialization. To support such patterns, it is within the true scope and spirit of the present invention to extend RJ with a facility to "freeze" a mutable object into an immutable relation tuple. Note that, in our current model, it is not possible to construct two tuples $t_1$ and $t_2$ such that the identity of $t_1$ is determined by $t_2$ and vice versa. The proposed extension would remedy this limitation.

Related Work

The C# language (see Microsoft. C# Language Specification. Microsoft Press, 2001, which is hereby incorporated by reference in its entirety) supports both reference equality and value equality. As in Java, C# Equals( ) supports reference equality by default for reference types. The C# programmer can override Equals and == to support structural or value equivalence as desired, raising the same issues as when overriding equals( ) in Java. C# also supports built-in structural equality for C# value types, but restricts value types to structs and enumerations, with no inheritance.

A relation type's key annotation enforces an immutability constraint on the annotated field. Several other works have addressed language designs that incorporate immutability concepts.

Pechtchanski and Sarkar (see Pechtchanski, I., and Sarkar, V. Immutability specification and its applications. In Java Grande (2002), pp. 202-211, which is hereby incorporated by reference in its entirety) propose a framework of immutability specification along three dimensions: lifetime, reachability, and context. Our key annotation provides a persistent and shallow immutability specification: a key field never mutates, but there is no constraint on mutability of state reached from a key field. In short, a key annotation behaves like "final" in Java. Of course, a key annotation conveys more information than simply immutability constraints; it also indicates what state constitutes the structural identity of a type.

Much other work defines analyses and expressive languages for immutability constraints (see Birka, A., and Ernst, M. D. A practical type system and language for reference immutability. In Proceedings of the 19th annual ACM SIGPLAN conference on Object-oriented programming, systems, languages, and applications (OOPSLA'04) (2004), pp. 35-49; Boyland, J., Noble, J., and Retert, W. Capabilities for sharing: A generalization of uniqueness and read-only. In Proceedings of the 15th European Conference on Object-Oriented Programming (ECOOP'01) (2001), pp. 2-27; Kniesel, G., and Theisen, D. Jac—access right based encapsulation for Java. Software: Practice and Experience 31, 6 (2001), 555-576; Porat, S., Biberstein, M., Koved, L., and Mendelson, B. Automatic detection of immutable fields in Java. In CASCON (2000), and Tschantz, M. S., and Ernst, M. D. Javari: adding reference immutability to Java. In Proceedings of the 20th annual ACM SIGPLAN conference on Object oriented programming, systems, languages, and applications (OOPSLA'05) (2005), pp. 211-230, which is hereby incorporated by reference in its entirety). Javari (see Tschantz, M. S., and Ernst, M. D. Javari: adding reference immutability to Java. In Proceedings of the 20th annual ACM SIGPLAN conference on Object oriented programming, systems, languages, and applications (OOPSLA'05) (2005), pp. 211-230, which is hereby incorporated by reference in its entirety) provides an extension of Java that supports reference immutability, and enforces specifications expressing transitive immutability constraints. Javari also allows for the declaration of read-only methods that cannot modify the state of the receiver object, and read-only classes for which all instance fields are implicitly read-only. In another embodiment, the programming model is combined with language extensions such as those in Javari, to support immutability constraints on non-key fields which do not contribute to the identity relation.

In the model of the present invention, a relation type that has only key fields is a value type. Value types (see Bacon, D. F. Kava: A Java dialect with a uniform object model for lightweight classes. Concurrency—Practice and Experience 15, 3-5 (2003), 185-206; Charles, P., Grothoff, C., Saraswat, V., Donawa, C., Kielstra, A., Ebcioglu, K., von Praun, C., Sarkar, V. X10: an object-oriented approach to non-uniform cluster computing. In Proceedings of the 20th annual ACM SIGPLAN conference on Object oriented programming, systems, languages, and applications (OOPSLA'05) (2005), pp. 519-538; Microsoft. C# Language Specification. Microsoft Press, 2001, and Yelick, K., Semenzato, L., Pike, G., Miyamoto, C., Liblit, B., Paul Hilfinger, A. K., Graham, S., Gay, D., Colella, P., and Aiken, A. Titanium: A high-performance Java dialect. Concurrency—Practice and Experience, Java Special Issue (1998), which is hereby incorporated by reference in its entirety) provide many benefits for the programmer. For example, they provide referential transparency: functions that manipulate only values have deterministic behavior. Since values are immutable, they eliminate aliasing issues and make code less error-prone. From an implementation viewpoint, value types simplify analyses that allow a number of aggressive compiler optimizations, such as unboxing (see Peyton-Jones, S., and Launchbury, J. Unboxed values as first class citizens. In Functional Programming Languages and Computer Architecture: 5th ACM Conference (1991), which is hereby incorporated by reference in its entirety), object inlining (see Dolby, J., and Chien, A. An automatic object inlining optimization and its evaluation. ACM SIGPLAN Notices 35, 5 (2000), 345-357, which is hereby incorporated by reference in its entirety), memorization (see Michie, D. Memo functions and machine learning. Nature, 218, 19-22, which is hereby incorporated by reference in its entirety), data replication in distributed or cluster computing settings (see Charles, P., Grothoff, C., Saraswat, V., Donawa, C., Kielstra, A., Ebcioglu, K., von Praun, C., and Sarkar, V. X10: an object-oriented approach to non-uniform cluster computing. In Proceedings of the 20th annual ACM SIGPLAN conference on Object oriented programming, systems, languages, and applications (OOPSLA'05) (2005), pp. 519-538, which is hereby incorporated by reference in its entirety), and hash-consing (see Appel et al. "Hash-Consing Garbage Collection" February 1993. Princeton University Computer Science Department, which is hereby incorporated by reference in its entirety).

Bacon's Kava language (see Bacon, D. F. Kava: A Java dialect with a uniform object model for lightweight classes. Concurrency—Practice and Experience 15, 3-5 (2003), 185-206, which is hereby incorporated by reference in its entirety) is a variation on Java with a uniform object model that supports user-defined value types. Kava's notion of a value is that of an immutable object, with all fields pointing to other values. All value types are subclasses of a type Value, and they may inherit from other value types and from interfaces. In Kava, the programmer views values as objects down to the bit-level, and the model provides a unification of objects and values in this sense. In our experience, Java programs commonly include "value-like" classes that define equality and hashcode based on an immutable subset of instance fields, but that also have some mutable state associated with them. Our relation types allow for such classes, and unify values and objects by providing a generalization of both as relations that map key fields to some possibly mutable state. Furthermore, due to this uniformity, we need not segregate type hierarchies for values and non-values, and a relation type may inherit from a value.

Our value-types are also more general than Titanium's (see Yelick, K., Semenzato, L., Pike, G., Miyamoto, C., Liblit, B., Paul Hilfinger, A. K., Graham, S., Gay, D., Colella, P., and Aiken, A. Titanium: A high-performance Java dialect. Concurrency—Practice and Experience, Java Special Issue (1998), which is hereby incorporated by reference in its entirety) immutable classes, and C#'s value types (see Microsoft. C# Language Specification. Microsoft Press, 2001, which is hereby incorporated by reference in its entirety), which do not support inheritance, and do not support "value-like" classes. Fortress's value objects (see Allen, E., Chase, D., Hallett, J., Luchangco, V., Maessen, J.-W., Ryu, S., Steele, G., and Tobin-Hochstadt, S. The Fortress language specification. http://research.sun.com/projects/plrg/fortress.pdf, which is hereby incorporated by reference in its entirety) also do not support "value-like" classes, but they do allow fields of values to be set in order to allow piecemeal initialization.

Tuples have been added to object-oriented languages in various work (for example (see Krall, A., and Vitek, J. On extending Java. In Joint Modular Languages Conference (JMLC'97) (1997); van Reeuwijk, C., and Sips, H. J. Adding tuples to Java: a study in lightweight data structures. In JGI'02 (2002), and Meijer, E., and Shulte, W. Unifying tables, objects and documents. In DB-COOL (2003), which is hereby incorporated by reference in its entirety)

Our tuples differ in that they have keys, similar to primary keys in a row of a relational database, and relation types implicitly define a map from keys to non-keys. A relation type does not contain two tuples with equal keys but different non-key parts.

Some languages integrate object and relational data models to facilitate com-munication with a database (for example, see Meijer, E., and Shulte, W. Unifying tables, objects and documents. In DB-COOL (2003), and Bierman, G., Meijer, E., and Schulte, W. The essence of data access in C. In European Conference on Object-Oriented Programming (ECOOP'05) (2005), which is hereby incorporated by reference in its entirety). The focus of our programming model is to view the heap itself as a relational database, and use concepts from databases such as primary keys to express identity. Other applications of the present invention include the application of relation types to support data access integration.

Linda's (see Carriero, N., and Gelernter, D. Linda in context. Commun. ACM 32, 4 (1989), 444-458, which is hereby incorporated by reference in its entirety) data model introduced an associative memory called a tuplespace as a model for sharing data in parallel programming. In another embodiment, relation types could be applied in this setting, providing a strong coupling between the object-oriented language and the distributed tuplespace. Relation types would also facilitate optimizations for data replication, as mentioned previously.

Summary

The present invention provides a programming model that provides a relational view of the heap. In this model, object identity is specified declaratively using a new language construct called relation types and programmers are relieved from the burden of having to write error-prone equals( ) and hashCode( ) methods. The present invention implemented the model as an extension of Java. The experiments carried out using the present invention indicate that the majority of classes that override equals( ) can be refactored into relation types, and that most of the remainder are buggy or fragile.

It is important to note that the model in the present invention can be extended with other features that borrow from database concepts (e.g., atomic sets, see Vaziri, M., Tip, F., and Dolby, J. Associating synchronization constraints with data in an object-oriented language. In POPL '06: Conference record of the 33rd ACM SIGPLAN-SIGACT symposium on Principles of programming languages (New York, N.Y., USA, 2006), ACM Press, pp. 334-345, which is hereby incorporated by reference in its entirety), and raise the level of abstraction for navigating the heap. Further the present invention can be used with a query language on top of relation types and features for pattern matching. The present invention can also be used to support delayed initialization of key fields, and to experiment with optimized representations for relation types.

Non-Limiting Hardware Embodiments

Overall, the present invention can be realized in hardware or a combination of hardware and software. The processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 7:
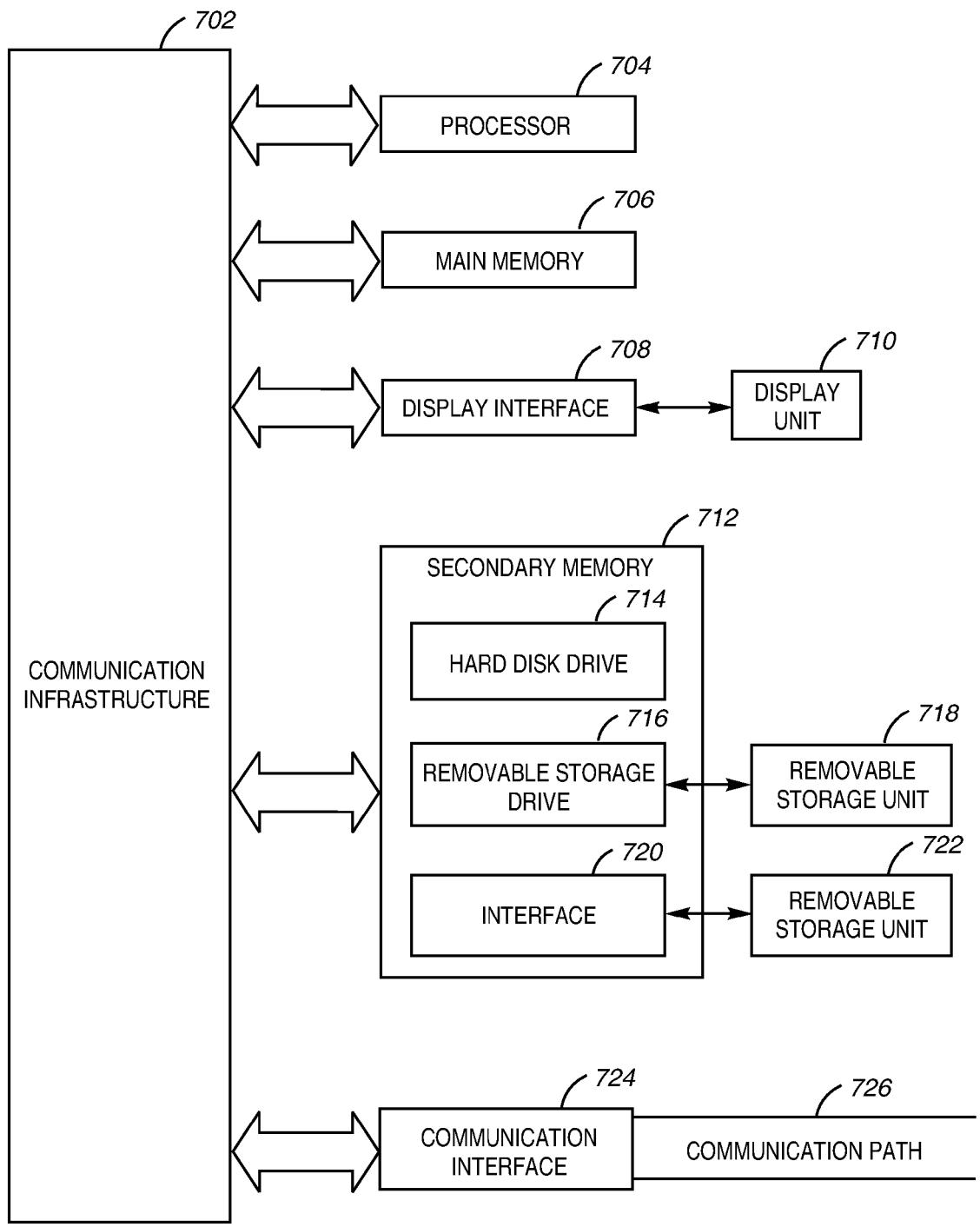
FIG. 7 is a block diagram of a computer system useful for implementing the software steps of the present invention.

An example of a computer system 700 is shown in FIG. 7. The computer system 700 includes one or more processors, such as processor 704. The processor 704 is connected to a communication infrastructure 702 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 700 includes a display interface 708 that forwards graphics, text, and other data from the communication infrastructure 702 (or from a frame buffer not shown) for display on the display unit 710. Computer system 700 also includes a main memory 706, preferably random access memory (RAM), and optionally includes a secondary memory 712. The secondary memory 712 includes, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. Removable storage unit 718, represents a floppy disk, magnetic tape, optical disk, etc. which is read by and written to by removable storage drive 716. As will be appreciated, the removable storage unit 718 includes a computer usable storage medium having stored therein computer software and/or data.

In alternative embodiments, the secondary memory 712 includes other similar means for allowing computer programs or other instructions to be loaded into computer system 700. Such means include, for example, a removable storage unit 722 and an interface 720. Examples of such include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer-based method for determining an identity for objects generated by an application, the method comprising:
   receiving a class C with a set of fields F, with a portion of the fields F designated as immutable;
   designating at least one subset of the set of immutable fields F as a set of key fields contributing to an identify of objects; and
   enforcing a relation that defines equality between the objects of the class C based on a combination of objects being a same type and the set of key fields which have been designated, even as values in mutable portions of the objects themselves change.

2. The computer-based method of claim 1, further comprising:
   generating an executable representation of the class C that contains code for performing equality checks.

3. The computer-based method of claim 2, wherein the executable representation of the class C contains code for computing a hash-code.

4. The computer-based method of claim 1, wherein the relation that defines equality which has been generated is an equivalence relation.

5. The computer-based method of claim 1, wherein the relation that defines equality is constant in response to at least two objects being equal during at least one point in time during program execution, then the objects remain equal throughout the program execution.

6. The computer-based method of claim 3, further comprising:
   storing objects of the class C using a shared representation according to the relation which has been generated.

7. The computer-based method of claim 1, wherein only one subset of the set of immutable fields F is designated as the set of key fields.

8. The computer-based method of claim 1, wherein the enforcing the relation that defines equality between objects of the class C has a property of grouping objects according to their identity.

9. The computer-based method of claim 1, wherein the designating at least one subset of the set of immutable fields F as the set of key fields includes using a programming language keyword.

10. The computer-based method of claim 1, wherein the designating at least one subset of the set of immutable fields F as the set of key fields includes designating classes and designating the subset of the set of immutable fields F within the classes which have been designated.

11. The computer-based method of claim 1, wherein each field in the subset of immutable fields F as the set of key fields which have been designated is immutable.

12. The computer-based method of claim 10, wherein designated classes are represented by relation types.

13. The computer-based method of claim 12, wherein the application may declare a plurality of relation types and reference types.

14. The computer-based method of claim 13, wherein the application of an operator to an operand of a relation type and an operand of a reference type results in the reporting of a compile-time error.

15. A non-transitory computer readable medium containing programming instructions for determining an identity for objects generated by an application, the programming instructions comprising:
   receiving a class C with a set of fields F, with a portion of the fields F designated as immutable;
   designating at least one subset of the set of immutable fields F as a set of key fields contributing to an identify of objects; and
   enforcing a relation that defines equality between the objects of the class C based on a combination of objects being a same type and the set of key fields which have been designated, even as values in mutable portions of the objects themselves change.

16. The computer readable medium of claim 15, further comprising:
   generating an executable representation of the class C that contains code for performing equality checks.

17. The computer readable medium of claim 16, wherein the executable representation of class C contains code for computing a hash-code.

18. The computer readable medium of claim 15, wherein the relation that defines equality which has been generated is an equivalence relation.

19. The computer readable medium of claim 15, wherein the relation that defines equality is constant in response to at least two objects being equal during at least one point in time during program execution, then the objects remain equal throughout the program execution.

20. A computer system for determining an identity for objects generated by an application, the computer system comprising:
   a storage medium readable by a processing circuit and storing computer instructions for execution by the processing circuit for performing a method comprising:

receiving a class C with a set of fields F, with a portion of the fields F designated as immutable;

designating at least one subset of the set of immutable fields F as a set of key fields contributing to an identify of objects; and enforcing a relation that defines equality between the objects of the class C based on a combination of objects being a same type and the set of key fields which have been designated, even as values in mutable portions of the objects themselves change.

* * * * *